Patented Mar. 3, 1942

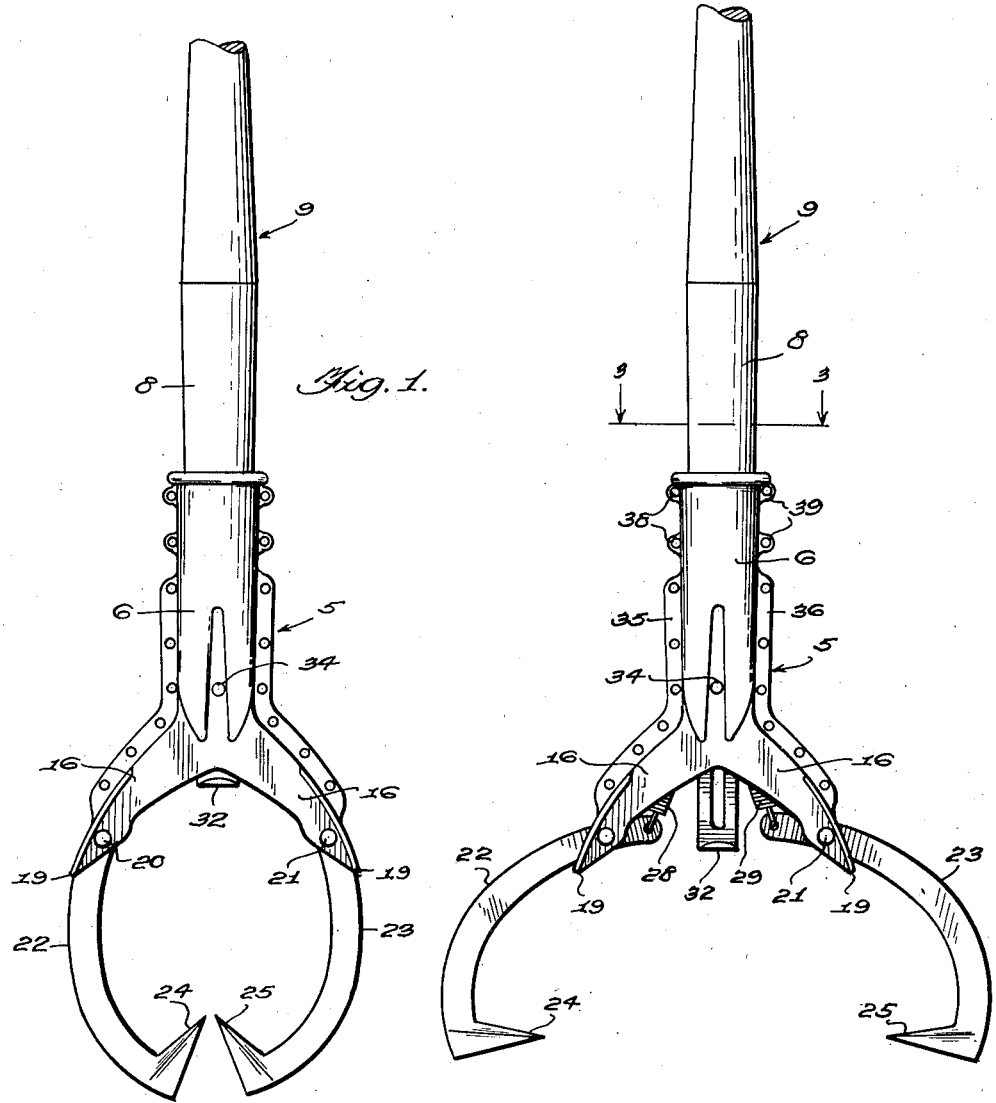

2,274,985

UNITED STATES PATENT OFFICE 2,274,985

LUMBER HOOK OR THE LIKE

Kenneth C. Jenne and George F. Manion, Lake Worth, Fla.

Application August 19, 1940, Serial No. 353,284

6 Claims. (Cl. 294—17)

Our invention relates to improvements in lumber hooks adapted to the handling and turning of logs, poles, and irregular shaped bodies, although not necessarily limited to the handling of lumber, and the primary object of our invention is to provide a device of this character which has independently acting hooks capable of positioning themselves relative to irregularities in the object to be handled, the said device involving means whereby the hooks are automatically maintained in engagement with the sides of the object so that the hands of the operator may be removed from the device and leave the device supported in place on the work.

Other important objects and advantages of our invention will be apparent from a reading of the following description taken in connection with the drawings, wherein for purposes of illustration we have shown a preferred embodiment of our invention.

In the drawings:

Figure 1 is a fragmentary side elevational view of the embodiment with the hooks in closed position.

Figure 2 is a view similar to Figure 1 but showing the hooks in open position.

Figure 3 is a horizontal sectional view taken along the line 3—3 of Figure 2, and looking in the direction of the arrows.

Figure 4:
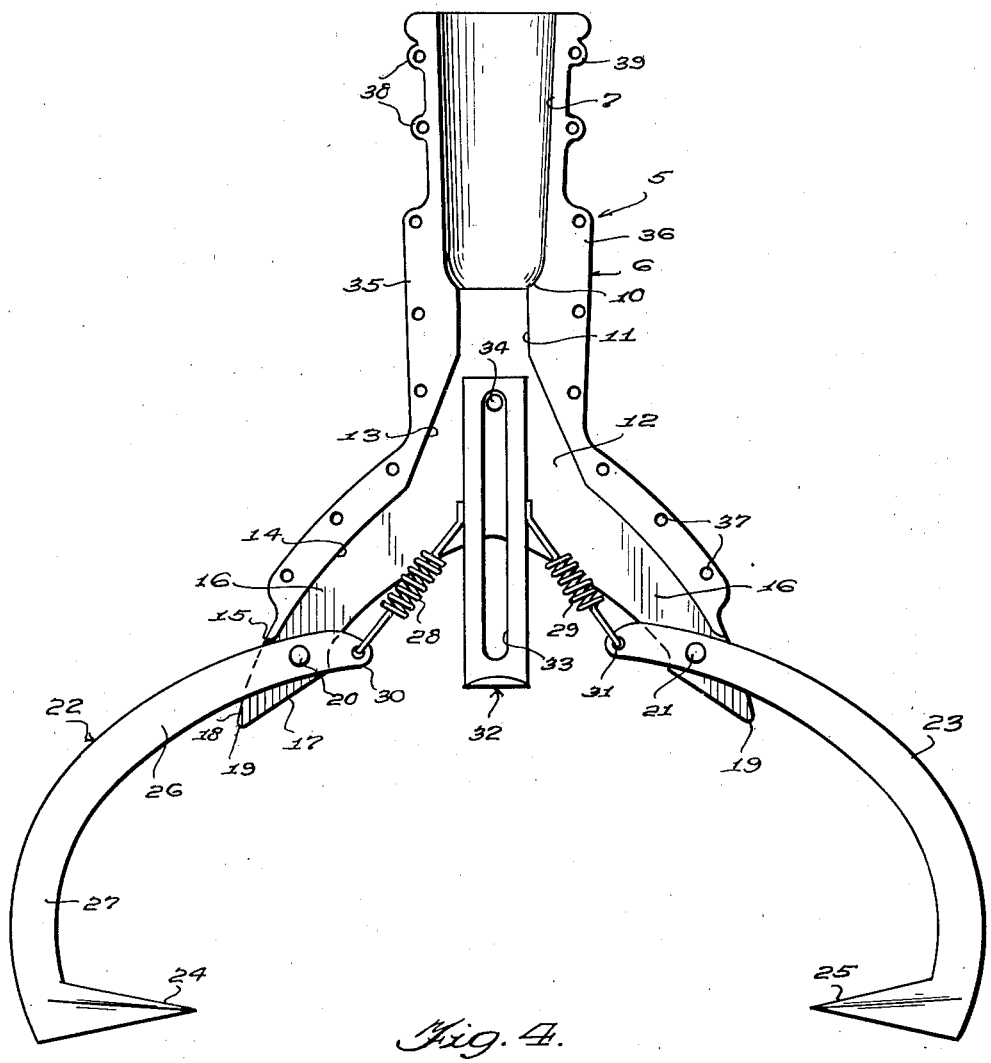
Figure 4 is an enlarged longitudinal vertical sectional view taken through Figure 2.

Referring in detail to the drawings, the working head of the device is generally designated by the numeral 5 and this is composed of two substantially similar inverted Y-shaped castings 6 which have in their upper part a semi-circular tapering recess 7, cooperating and providing a socket for reception of the tapered lower part 8 of the handle which is generally designated 9. The lower ends of the recesses 7 are reduced and rounded as indicated by the numeral 10 to provide an abutment for the lower end of the handle. This reduced end opens into the free end of the standard portion 11 of a Y-shaped recess 12. The standard portion of these recesses has the opposite sides thereof standing laterally outwardly and downwardly as indicated by the numeral 13 to provide clearance for a purpose to be explained. The lateral walls of the portion 13 join the upper ends of gently curved continuing walls 14 which terminate at the point 15 in upwardly spaced relation to the lower ends of the arms or legs 16 which are formed in continuation of the web extending between the lateral wall portions 13 and 14, as clearly shown in Figure 4.

The said lower ends of the legs 16 have sharply angulated laterally inward surfaces 17 which meet the laterally outward surfaces 18 in a rounded point 19.

Pivots 20 and 21, respectively, project inwardly from the arms 16 at a point slightly spaced below the lower ends 15 of the wall portions 14 and above the surfaces 17, and somewhat laterally inwardly of the middle point between the laterally inward and laterally outward surfaces of the arms 16.

On each of the said pivots is mounted a corresponding hook 22, 23, respectively, which has a substantially right angularly and inwardly directed point 24, 25, respectively, the bodies of the hooks being relatively small in cross section and gently curved in the region designated by the numerals 26, merging into a more sharply laterally curved portion 27 on the lower end of which the points are formed. The pivots 20 and 21 traverse the upper and laterally inward end portions of the hook bodies 26 at a point laterally inwardly located with respect to the terminals of the points 24 and 25 when the hooks 22 and 23 are in the extreme opened position illustrated in Figure 4.

Helical springs 28 and 29 are stretched between the short extensions beyond the pivots which are present on the upper ends of the hooks and are respectively designated by the numerals 30 and 31, and intermediate points on the opposite side edges of the plunger or slide 32 which is a vertically elongated plate provided with a longitudinal slot 33 which loosely receives the pin 34 which projects across and between the castings 6. The lower end of the plunger or slide 32 extends into a position relative to the hooks 22 and 23, to engage the log or the like somewhat in advance of or simultaneously with the points 24 and 25 of the hooks, when the device is engaged with the log, so that upward movement of the slide from its depressed position shown in Figure 4 takes place as a result of engagement with the work, with the consequence that tension is placed on the springs 28 and 29 and the hooks 22 and 23 are caused to move toward engagement with the opposite sides of the log or the like and sufficiently embed the points 24 and 25, respectively, in the sides of the log or the like, to operate in conjunction with the slide 32 in maintaining the device in place on the log without any other support. It will be observed that the individual freedom of the springs 28 and 29 and the hooks 22 and 23 allows the hooks to individually adjust themselves to engagement with the log or the like so as to compensate for irregularities in the surfaces engaged by the hooks.

The castings 6 have lateral matching flanges 35 and 36 which extend along a substantial portion of the standard part of the Y castings and along the upper edges of the legs thereof, these flanges being provided with bolt holes 37 to accept bolts or rivets for securing the castings together. Logs 38 and 39 on the opposite edges of the castings above the flanges 35 and 36 also have holes to accept rivets or bolts for securing the upper portions of the standard parts of the castings in assembled relation.

Although we have shown and described herein a preferred embodiment of our invention, it is to be definitely understood that we do not wish to limit the application of the invention thereto, except as may be required by the scope of the subjoined claims.

Having described the invention, what is claimed as new is:

1. A device of the character described, said device comprising a handle having a working head on one end thereof, said working head comprising a body, a pair of substantially parallel laterally spaced pivots on the lower part of said body, a pair of laterally outwardly curved hooks having laterally inwardly projecting points on their lower ends, said hooks being swingably mounted on the said pivots at points sufficiently removed from the upper ends of the hooks to provide a relatively short laterally inwardly extending lever on the upper end of each hook, a slide mounted on said body between the upper ends of said hooks for vertical and lateral movement, contractile springs stretched between the said levers and the slide whereby upward movement of said slide consequent upon engagement of the lower end of the slide with a log or the like to be handled tensions the springs to swing the hooks to engage their points conformably with the opposite sides of the log or the like.

2. A device according to claim 1 wherein said body consists of a mating pair of hollow sections between which said slide and the upper parts of the hooks are located.

3. A device according to claim 1 wherein said body consists of a mating pair of hollow sections between which said slide and the upper parts of the hooks are located, said sections comprising inverted Y-shaped castings having matching assembling lugs on their lateral edges for accommodating assembling means.

4. A device of the character described, said device comprising a handle having a working head on one end thereof, a pair of laterally spaced pivots on said head, a pair of laterally inwardly projecting impaling points on said lower ends, said hooks being swingably mounted in substantially the same plane on said pivots at points adjacent to their upper ends to provide relatively short laterally inwardly projecting levers above the pivots, a vertical slide pivotally and slidably mounted on said head between said hooks, and independent contractile springs stretched between said levers and said slide, whereby advance engagement of said slide with the work yieldably operates the hooks individually to force their impaling points into engagement with opposite sides of the work.

5. A device of the character described comprising a handle equipped head, a pair of hooks pivoted to laterally spaced parts of said head, each of said hooks comprising a laterally inwardly directed lever above the pivotal point and a laterally inwardly directed impaling point spaced below the pivotal point, an operating member movably mounted on said head between said hooks, and spring means operatively connecting said levers and said operating means.

6. A device of the character described comprising a handle equipped head, a pair of hooks pivoted to laterally spaced parts of said head, each of said hooks comprising a laterally inwardly directed lever above the pivotal point and a laterally inwardly directed impaling point spaced below the pivotal point, an operating member movably mounted on said head between said hooks, and spring means operatively connecting said levers and said operating means, said operating means having a part extending between said hooks to be engaged with the work to contract the hooks into opposite sides of the work.

KENNETH C. JENNE.
GEORGE F. MANION.